Jan. 19, 1926. 1,570,560
W. H. EMOND
BODY CONSTRUCTION FOR VEHICLES
Original Filed Sept. 13, 1923   3 Sheets-Sheet 1
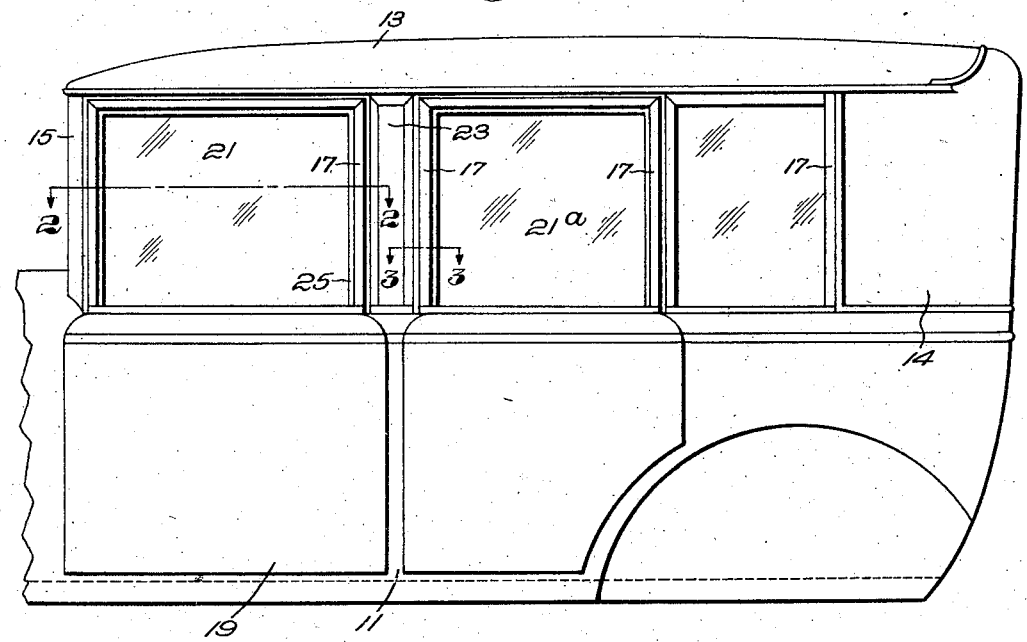
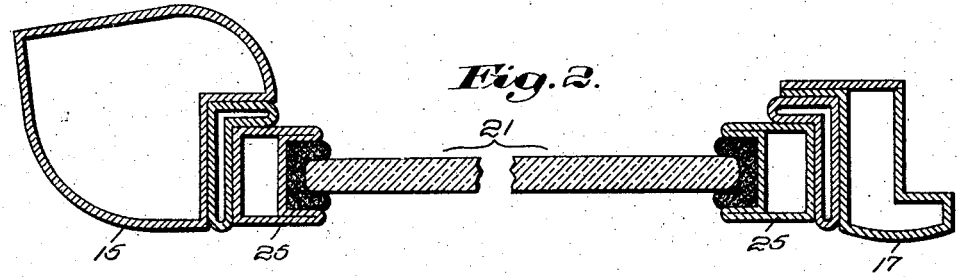
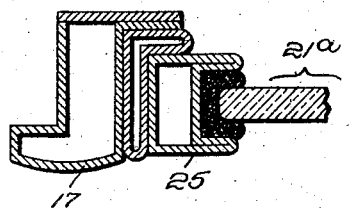

Jan. 19, 1926.
W. H. EMOND
1,570,560
BODY CONSTRUCTION FOR VEHICLES
Original Filed Sept. 13, 1923   3 Sheets-Sheet 2
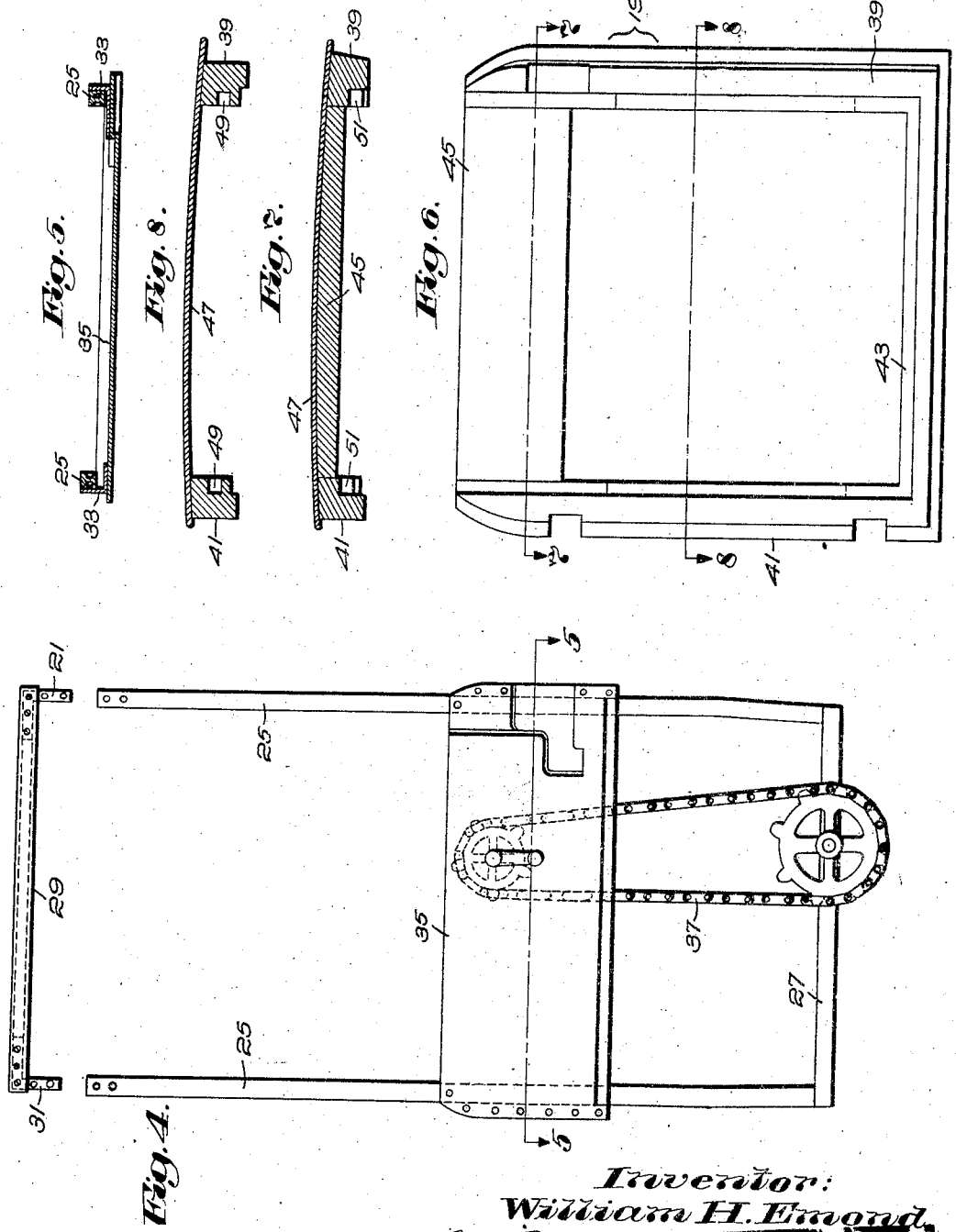

Jan. 19, 1926.  1,570,560
W. H. EMOND
BODY CONSTRUCTION FOR VEHICLES
Original Filed Sept. 13, 1923    3 Sheets-Sheet 3
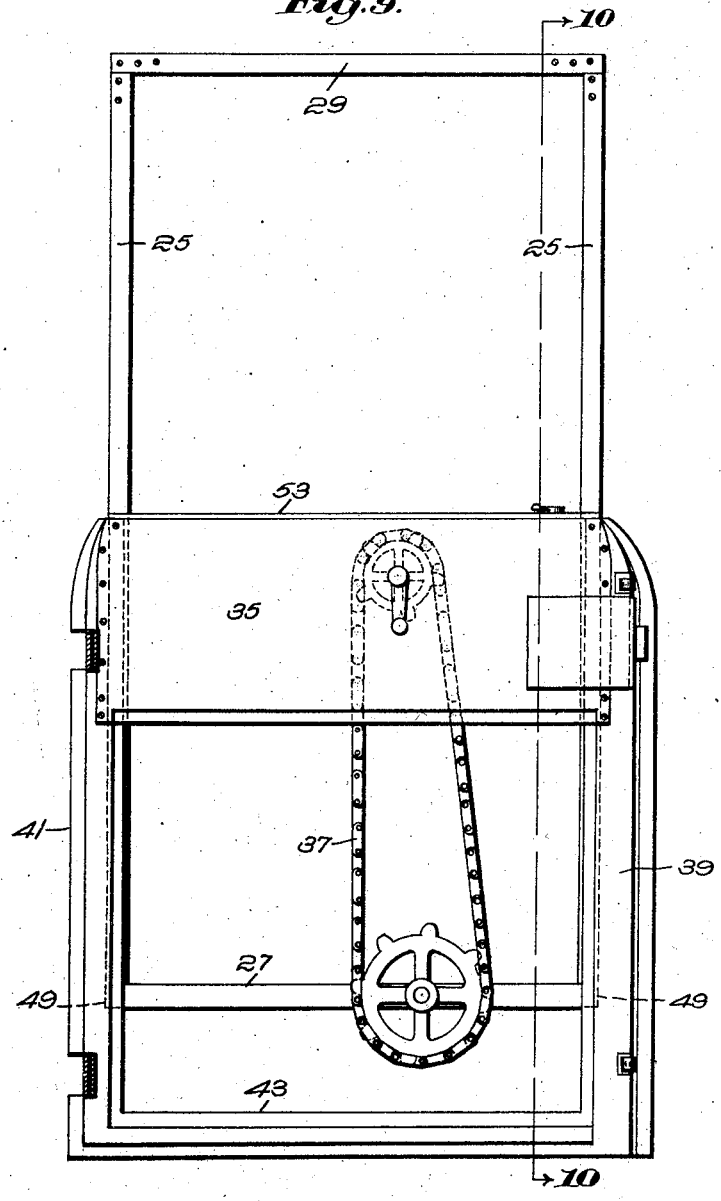
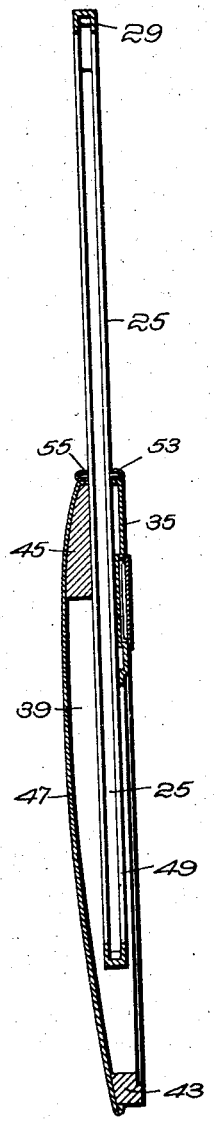

Patented Jan. 19, 1926.

1,570,560

UNITED STATES PATENT OFFICE.

WILLIAM H. EMOND, OF SYRACUSE, NEW YORK.

BODY CONSTRUCTION FOR VEHICLES.

Original application filed September 13, 1923, Serial No. 662,472. Divided and this application filed December 14, 1925. Serial No. 75,280.

*To all whom it may concern:*

Be it known that I, WILLIAM H. EMOND, a citizen of the United States, and a resident of Syracuse, county of Onondaga, State of New York, have invented an Improvement in Body Construction for Vehicles, of which the following description, in connection with the accompanying drawings, is a specification, like characters on the drawings representing like parts.

The invention relates to vehicles and more particularly to the construction of bodies of the closed type for automotive vehicles. A cardinal purpose of the invention is to provide such a body wherein the opaque structural elements of the upper portion thereof, that is, the portion above the belt line, may be substantially reduced in bulk whereby the vision of the occupants of the vehicle is not interfered with. At the same time the preferred form of the invention provides for the production of a body of seemly appearance and of adequate strength and offers considerable advantages and economies in construction.

My invention will be more fully understood by reference to the following description taken in connection with the accompanying drawings, wherein for purposes of illustration I have shown an automotive vehicle of the closed type such as is commonly known as a four-door sedan and which serves as an illustrative example of my invention. In the drawings:—

Fig. 1 is a partial side elevation of the body of a closed vehicle;

Figs. 2 and 3 are sections on an enlarged scale on the lines 2—2 and 3—3 of Fig. 1, respectively;

Fig. 4 is an elevation of one of the units of which the door is constructed as seen from the inner side of the door;

Fig. 5 is a section on the line 5—5 of Fig. 4;

Fig. 6 is an elevation of a cooperating unit from which the door is constructed;

Figs. 7 and 8 are sections on the lines 7—7 and 8—8 of Fig. 6, respectively;

Fig. 9 is an elevation of the door substantially complete on a somewhat larger scale; and Fig. 10 is a section on the line 10—10 of Fig. 9.

Referring to the drawings and particularly Figs. 1 to 3 thereof, I have there shown as an example of my invention a four-door vehicle of the sedan type embodying a lower body section 11 and a permanent roof or top 13 supported from the lower body section by the quarter 14 and permanent top-supporting posts, such as front posts 15, arising adjacent the cowl and serving in the example illustrated as a support for the wind-shield, and side posts 17. Access to the vehicle is had through doors which, as is customary in such vehicles, extend from the floor or sill to the roof or top 13, the upper part of these doors each comprising a fixed window frame 21 receiving a vertically sliding glazing. The posts 15 and 17 may arise adjacent the openings in the lower body section which are closed by the lower body portions 19 of these doors and in cooperation therewith form door-receiving openings, the posts forming portions of the jambs of the door-receiving frame.

In the customary construction of closed vehicles of this type the posts or door jambs and the adjacent pillars of the door proper form relatively bulky assemblies and offer a considerable obstruction to the vision of the occupants of the vehicle. The obstruction arises both from the thickness of the parts measured longitudinally of the vehicle and from the thickness measured transversely. My invention provides for a reduction of the size of these parts so that they may be received within a circumscribing circle of very small diameter while strength and durability are in no way sacrificed.

Referring to Figs. 2 and 3, while the construction of the door-receiving frame might be of any desired or suitable type, conveniently and in consonance with the endeavor to minimize the bulk of the frame-work of the vehicle above the belt line the posts 15 and 17 are of suitable tubular steel shapes. The side posts 17, as illustrated in Figs. 2 and 3, may be of counterpart form, although reversed in position in the example illustrated, to accommodate the front window 21 and the second window 21ª and to provide between them for an intermediate section of panelling or glazing 23.

In accordance with my invention the upper portion of the door or at least that part thereof which closes against the forward post 15 is constructed solely as a guide for the sliding window. At the same time the other portions of the door may be made of such substantial and rigid construction as to ensure strength and durability. In the embodiment of the invention illustrated this object is effected and other advantages obtained by constructing the door from two relatively light and wieldy units. In the form shown one of these units illustrated particularly in Fig. 4 provides for the assembly and coordination of the parts of the window or glazing which forms the upper part of the complete door and the other unit illustrated in Fig. 6 might be said in a general way to comprise the lower door-portion 19. For convenience in referring to these units and without any defining intention I shall herein call them the window unit and the door unit.

Referring to Figs. 4 and 5, the window unit may comprise a suitable tall window frame, preferably constructed of metal, and embodying the two channel sides 25 more clearly illustrated in Fig. 2 which provide guideways in which the light or glazing of the window, whether or no equipped with a sash, may slide. In the form of the invention illustrated the glass is fitted directly into these channels without any sash but with the customary felt packing 26 and in this instance the side members preferably have the sectional form clearly illustrated in Fig. 2 with a tubular body portion. The window frame is completed by lower and upper cross members 27 and 29 and the member 29 is secured to the members 25 by the angles 31 and is conveniently made readily removable as indicated in Fig. 4 to provide access to the interior of the channels so that the light or pane of the window may be readily slid into the channels from the top either before or after the window section now being described is assembled with the door section. Secured to the side members 25 (see Fig. 5), conveniently by means of angles 33, is the metallic lock-bar 35 suitably formed to accommodate the lock and in cooperation with the rectangular window frame providing for the support of various parts and mechanisms which are associated with or used in controlling the window. As a graphic example I have herein partially illustrated a suitable window regulator 37, so-called, for raising and lowering the window in the frame and which is supported on the lower cross member 27 and the lock-bar 35. It will be seen that while the unit shown in Fig. 4 is relatively large, it is of light and simple construction and it may be readily handled and prior to any assembly with the other parts of the door, the various mechanisms associated with the sliding window proper may be secured in position and adjusted.

Referring now to Figs. 6, 7 and 8, the lower door section is constructed as an independent unit and may comprise a lock pillar 39, a hinge pillar 41 and a bottom rail 43, these parts being conveniently, though not necessarily, constructed of wood, a belt-bar 45 joining the upper ends of the pillars and the outer panel 47. These parts though relatively bulky and heavy constitute a unit relatively small in size and correspondingly wieldy. The inner faces of the pillars 39 and 41 are provided with the grooves or sockets 49 adapted to receive the lower portion of the window frame and the upper portions and one flange of these sockets is cut away providing the rabbets 51 against which portions of the channels 25 of the window unit fit and also receiving the lock-bar 35 of the window unit. This door unit may be handled by jig operations on the bench, constructed as shown and completed with any necessary or usual fittings. The two units as shown in Figs. 4 and 6 may then be assembled to form the substantially complete door as shown in Figs. 9 and 10 by simply inserting the lower portion of the window frame into the sockets 49 and securing the belt-bar 35 to the pillars, either before or after the lower door section 19 is hung and either before or after the window pane or light proper is inserted through the upper ends of the channels. In either instance all the necessary parts and mechanisms for controlling and operating the window may be attached, lined up and adjusted on the window frame unit as shown in Fig. 4 before it is assembled with the door section of Fig. 6 and likewise the door section may be completed and provided with suitable or desired fittings before it is assembled with the large window casing. At the same time the bringing together or assembling of these two units is substantially a mere juxtaposition or fitting together instead of a building operation.

I have not attempted to show in detail, particularly in Figs. 4 and 6, all the various elements or fittings which might be attached or adjusted to the window unit or the door unit in the course of their construction as the number and nature of these might vary in accordance with circumstances and the dictates of convenience. The illustrations in Figs. 4 and 6 and to an extent the illustrations in Figs. 9 and 10 may be taken, therefore, as somewhat diagrammatic graphical illustrations as will be readily understood in view of this statement. It will also be understood that the interior surface of the lower portion of the door illustrated in Figs. 9 and 10 is upholstered or finished in any suitable or desired way.

Referring to Fig. 10, the door may be completed by the removable sills 53 and 55 fitting the sides of the window and its frame and closing the top of the door section.

Conveniently both the sills are removable or displaceable, and in particular the sill 55 to permit the light proper to be inserted into the upper end of the channels 25 when the top piece or lintel 29 is removed in the manner illustrated in Fig. 4 and to permit any fitting or framing at the bottom of the light to pass into the interior of the door structure, for instance, for connection to the window controlling mechanism 37.

In the preferred embodiment of the invention shown the pillars 39 and 41 extend only substantially half the height of the door and terminate adjacent the belt line of the vehicle and the upper section of the door, which extends above the lower body section 11 of the vehicle, as illustrated in Fig. 1, consists solely of a relatively light window frame lying between the faces and between the edges of the lower door section 19. The sides of this frame consist of the channels 25 which are merely supports and guides for the movable glazing 21 and are of no greater size than is required for this function. This frame is adapted to close against the top-supporting posts, as indicated in Fig. 2, the channels 25 being received in the rabbets of these posts so that the window closes the upper portion of the door opening defined by the posts to complete the closure of the vehicle. To permit this construction the posts may be offset, that at the forward side of the door rearwardly and that at the rearward side forwardly, as illustrated in Fig. 1 and overhang somewhat the pillars 39 and 41 of the lower door section.

The upper portion of the door body comprising the permanently projecting window frame is thus of very small dimensions considered both longitudinally and transversely and in cooperation with the small pillars provide assemblies of small size which offer relatively little impediment to vision. The post, as 15, and the channel 25 which fits thereagainst need occupy no more space than the corresponding pillar or side frame member of a conventional door, even disregarding the post or jamb with which such a pillar cooperates. At the same time the lower door body 19 may be made of any desired size to provide adequate strength and durability. The reduction of the dimensions of the upper portion of the window entails no sacrifice of strength or rigidity in that portion of the door. In the form of the invention shown the door as a whole is provided with hinges installed solely on the lower door section (although the invention is obviously not limited to such construction) and it might be said that this relatively massive lower door section carries and suspends the relatively light window supporting and controlling unit illustrated in Fig. 4. The permanently projecting portion of the window frame is relatively short and although its parts are of small section it may be made of ample rigidity for the function which it has to serve, to wit, as a carrier for the sliding glass. In the form shown wherein the window section comprises two guides 25 which are maintained in a common plane by a plurality of cross pieces, herein three such pieces, the lintel 29, the cross member 27 and the lock-bar 35, a ready installation of the window proper is much facilitated as contrasted with the difficult task of attaching guides to the sides of the assembled door and the accurate fitting or alignment of such guides.

The greater width of the lower door section on the lock side permits the spindle of the door handle to pass through the lower door section exteriorly of the adjacent guide 25 for the glazing and out of the way of the sliding glass and provides space for the shooting of the bolt.

In the preferred embodiment of the invention shown the top-supporting pillars 15 and 17 are offset on both sides of the door opening. The window frame and the upper part of the vehicle as a whole is thus symmetrically arranged and of an attractive appearance.

The present application is a division of my co-pending application Serial No. 662,472, filed Sept. 13, 1923, in which co-pending application I have claimed the door construction as such. In the present application I have claimed solely the construction of closed body herein described wherein the door is so arranged in combination with the supporting posts or other frame-work of the vehicle as to provide by the mutual cooperation of such parts a vehicle body having marked advantages particularly in the matter of improved vision for the occupants as will have been fully understood from the preceding description I have described in detail the particular embodiment of my invention shown in the accompanying drawings, using specific descriptive words in doing so in order that it might be readily understood and not attempting in the course of the description to indicate in a more generic way what was exemplified by the specific structure shown and described. The specific disclosure and language used in describing it are not therefore to be taken in a limiting sense and the more general principles exemplified by my invention which I claim as new and desire to secure by Letters Patent I shall express in the following claims.

Claims—

1. A vehicle body of the closed type comprising a lower body section from which rise permanent top-supporting posts, said body section having an opening cooperating with certain of the posts to define a door opening, a door for said body opening, a metallic window frame fixedly carried by said door and having continuous side members within which the window slides between an extreme raised position and an extreme lowered position beneath the belt line and which permanently project above the belt line of the door and which close between said posts.

2. A vehicle body of the closed type comprising a lower body section from which rise top-supporting posts defining with top and body a frame-like opening and a unit comprising a relatively tall frame fixedly mounted in the lower body section and having an upper portion permanently projecting above the lower body section and received between the posts and a glazing movable up and down within said frame between an extreme raised position and an extreme lowered position beneath the belt line.

3. A vehicle body of the closed type comprising a lower body section from which rise fixed top-supporting posts, said body section being provided with sockets adjacent said posts, a metallic window frame mounted as a unit therein and having long continuous side members received in said sockets and fixedly supported therein to provide a frame permanently projecting above said lower section and received between said posts and a window in said frame, slidable therein to be supported within the frame above said body section or below the belt line of the latter.

4. An automotive vehicle of the closed type having a lower body section provided with a forward door opening having a jamb adjacent the cowl, forward pillars rising from the cowl and offset rearwardly from the line of the jamb, a door in said lower body section and a window frame carried by said door having a permanently projecting upper portion comprising a guide within which the window slides between a raised position above the belt line and a lowered position beneath the belt line, the projecting portion of the guide closing directly against said offset pillar.

5. An automotive vehicle of the closed type having a lower body section provided with a forward door opening having a jamb adjacent the cowl, a lower door section in the lower body section fitting against the jamb, a tall rigid window frame of such length as to provide for the sliding of the window within the same from extreme raised to extreme lowered position, the lower portion of said frame being fixedly set in said door between the faces and between the edges thereof and a pillar rising from the cowl and offset to overhang the lower door section and mate with the edge of said frame projecting above the door section.

6. An automotive vehicle of the closed type comprising a lower body section having a door opening, fixed pillars supporting the top, a door in said opening, a window frame permanently projecting above the belt line of the door and a window slidable within the same between a position above the belt line and a position below the latter, said frame comprising on the side adjacent the lock stile of the door a continuous narrow channel in which the window slides, said channel being inset from the adjacent edge of the door body and closing directly against a pillar.

7. An automotive vehicle of the closed type comprising a lower body section having a forward door opening, fixed pillars supporting the top comprising a corner pillar projecting adjacent the cowl and the forward side of said opening, a door in the opening, a window frame permanently projecting above the belt line of the door and a window slidable within the same between a position above the belt line and a position below the same, said frame comprising on the forward side a continuous narrow channel in which the window slides, inset from the adjacent edge of the door body and closing directly against said corner pillar.

8. An automotive vehicle of the closed type comprising a lower body section having front and rear doors, fixed top-supporting pillars defining openings above the doors and including a pillar at the rear of the front door offset forwardly and a pillar at the front of the rear door offset rearwardly, a glazed section between the pillars, window frames permanently projecting above the belt line of the doors, windows slidable within said frames between a raised position closing said openings and a lowered position wherein they are received below the belt line, said frames comprising on the opposed sides of the two doors continuous narrow channels in which the windows slide, inset from the adjacent edges of the door bodies and closing directly against said pillars.

9. A vehicle body of the closed type comprising a lower body section from which rise permanent top-supporting posts, an opening in said body section cooperating with certain of said posts to define a door opening, one of the posts at said opening having a door receiving rabbet, a door closing the opening, the upper portion of the door above the belt line being a window frame of relatively light construction as compared with the lower portion of the door and comprising a lintel and the permanently projecting portions of channel guides incorporated with the framework of the lower portion of the door and rising therefrom, said guides being of a restricted section providing a support for a glazing and within which a glazing may slide between a position closing the opening above the door to a position beneath the belt line, said guides closing against the posts and into said rabbet.

10. A vehicle body of the closed type comprising a lower body section from which rise permanent top-supporting posts, an opening in said body section cooperating with certain of the posts to define a door opening, a door closing the opening comprising a lower portion which closes the opening of the lower body section and an upper portion above the belt line which is a rigid window frame of relatively light construction as compared with the lower portion of the door and of less width than the same, which frame consists of channel side guides of restricted section to provide a support for the glazing and a lintel connecting said guides, said frame being permanently carried in fixed position by the lower portion of the door and closing against said posts to close the opening between the lower body section and the top and a sliding glazing which may alternatively be received in said frame to close the opening in the upper portion of the door or housed within the lower portion.

In testimony whereof, I have signed my name to this specification.

WILLIAM H. EMOND.